UNITED STATES PATENT OFFICE.

EBERHARD BRAUER, OF LEIPZIG, GERMANY.

PROCESS OF CONCENTRATING NITRIC ACID.

1,008,690.   Specification of Letters Patent.   Patented Nov. 14, 1911.

No Drawing.   Application filed June 15, 1910. Serial No. 566,999.

*To all whom it may concern:*

Be it known that I, EBERHARD BRAUER, a subject of the German Emperor, and resident of Leipzig, in the Kingdom of Saxony, German Empire, have invented new and useful Improvements in the Process of Concentrating Nitric Acid, of which the following is a full, clear, and exact specification.

Various methods or processes for concentrating nitric acid have been proposed and used. The process hereinafter referred to is an important improvement thereon. Sulfuric acid as a dehydrating agent in concentrating dilute nitric acid by distillation possesses this disadvantage, that in addition to the water with which it chemically combines to a considerable extent it also unites with the nitric acid itself, with the result that the boiling point of the mixture is remarkably increased whereby a considerable decomposition of the nitric acid takes place in addition to an increased expenditure of heat, as compared with the simple distillation.

Salts such as calcium nitrate when used as dehydrating agents have the disadvantage that the mixture when distilled begins to foam. This causes technical difficulties and the distillation products are thus subject to contamination. Further, when distilling off the concentrated acid and the combined water the mass becomes solid. This causes local superheating, sudden shocks in the liquid and even explosions. Further the heating effect is decreased in consequence of the bad transmission of heat from the walls of the vessel to the swelling salt.

The use of acids of the phosphoric acid group, especially phosphoric and arsenic acid, as compared with the above, possesses the following advantages: They do not enter into any chemical combination with the nitric acid, but merely combine with the water. The production of a nitric acid which contains but little water, from a mixture of diluted nitric acid and phosphoric or arsenic acid, therefore does not require any kind of decomposition of any chemical compound, as is the case when employing sulfuric acid as a concentrating agent. There is no danger of the mass becoming solid. It is, therefore, neither necessary to employ more heat than required for mere distillation, which means a saving in fuel, nor is there any fear of a decomposition of the nitric acid taking place. Hence, it is possible without any special manipulations to obtain as a product a nitric acid of a high percentage and free from nitric oxid.

In place of phosphoric acid or arsenic acid alone, a mixture of both acids may be used.

*Examples.*

1. A retort containing say 100 kilograms of arsenic acid is charged with 50 kilograms of nitric acid of 65 per cent. strength which, as is well known, cannot be further concentrated by fractional distillation by reason of its constant boiling point. During the distillation the first fraction which passes with 97 per cent. strength in 30% of the pure nitric acid contained in the original diluted nitric acid. The first 86 per cent. of the quantity of pure nitric acid in the original dilute nitric acid used, when collected together, will result in an acid of 94 per cent. strength. The next 14 per cent. of the quantity will still contain 47 per cent. Ultimately pure water will pass. When so conducting the process that the distillation is stopped only when nothing but pure water passes, the entire quantity of nitric acid employed will be recovered in the form of nitric acid of 86.9 per cent. strength.

2. A retort containing 100 kilograms of syrupy phosphoric acid of 1.7 specific gravity is charged with 50 kilograms of nitric acid of 65 per cent. strength. On heating nitric acid of nearly 100 per cent. strength is distilled off, the concentration decreasing when the distillation is continued. On stopping the distillation when 80 per cent. of the absolute nitric acid contained in the diluted nitric acid used have passed over, a nitric acid of 92 per cent. strength is obtained.

3. A retort is charged with 50 kilos of arsenic acid and 50 kilos of phosphoric acid, and 50 kilos of nitric acid of 65 per cent. strength are added. On heating the mixture the first fraction which distils off has a strength of somewhat more than 95 per cent. and is 40 per cent. of the pure nitric acid contained in the original diluted nitric acid. On stopping the distillation when 80 per cent. of the used quantity of pure nitric acid in the original dilute nitric acid have passed over, a nitric acid is obtained having an average strength of 92.6 per cent.

What I claim is:—

1. The process of concentrating nitric acid containing water consisting in distilling said dilute acid in the presence of a dehydrating acid inert to nitric acid.

2. The process of concentrating nitric acid which consists in distilling nitric acid containing water with arsenic acid.

In testimony that I claim the foregoing as my invention, I have signed my name in presence of two subscribing witnesses.

EBERHARD BRAUER.

Witnesses:
 GERT. BONA,
 H. J. DUNLAP.